(12) United States Patent
Krause et al.

(10) Patent No.: US 6,432,869 B1
(45) Date of Patent: Aug. 13, 2002

(54) MOLDINGS INCLUDING PYROGENIC MIXED OXIDE AND THE USE THEREOF

(75) Inventors: Helmfried Krause, Rodenbach; Hermanus Gerhardus Josef Lansink Rotgerink, Mömbris-Mensengesäss, both of (DE); Thomas Tacke, Paducah, KY (US); Helmut Mangold, Rodenbach (DE); Heike Riedemann, Mömbris (DE); Manfred Fuchs, Alzenau (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 09/401,498

(22) Filed: Sep. 22, 1999

(30) Foreign Application Priority Data

Sep. 24, 1998 (DE) .......................................... 198 43 845

(51) Int. Cl.⁷ ............................. B01J 21/08; C09C 1/36; C08K 3/00; C04B 14/04; C07C 29/04

(52) U.S. Cl. ..................... 502/239; 502/232; 502/235; 502/236; 502/238; 502/242; 502/349; 502/350; 502/351; 502/355; 106/436; 106/438; 106/442; 106/450; 106/481; 106/483; 568/896; 568/898; 264/239

(58) Field of Search ................................ 502/232, 235, 502/236, 238, 239, 242, 350, 355, 351, 349; 106/436, 438, 442, 450, 481, 483; 568/896, 898; 264/239

(56) References Cited

U.S. PATENT DOCUMENTS

| | | | |
|---|---|---|---|
| 4,139,494 A | 2/1979 | Itoh et al. ............... | 252/455 R |
| 4,482,642 A | 11/1984 | Ettlinger et al. ............ | 502/232 |
| 5,002,917 A | 3/1991 | Deller et al. ................ | 502/242 |
| 5,002,918 A * | 3/1991 | Deller et al. ................ | 502/263 |
| 5,004,719 A | 4/1991 | Deller et al. ................ | 502/242 |
| 5,015,615 A | 5/1991 | Deller et al. ................ | 502/263 |
| 5,021,378 A * | 6/1991 | Deller et al. .................. | 502/62 |
| 5,086,031 A | 2/1992 | Deller et al. ................ | 502/251 |
| 5,231,067 A | 7/1993 | Deller et al. ................ | 502/350 |
| 5,366,938 A * | 11/1994 | Deller et al. ................ | 501/134 |
| 5,776,240 A * | 7/1998 | Deller et al. ................ | 106/482 |
| 5,808,136 A | 9/1998 | Tacke et al. ................ | 560/243 |
| 5,824,825 A * | 10/1998 | Lansink-Rotgerink et al. ... | 568/898 |
| 5,858,906 A * | 1/1999 | Deller et al. ................ | 502/170 |

FOREIGN PATENT DOCUMENTS

| | | |
|---|---|---|
| DE | 31 32 674 C2 | 12/1983 |
| DE | 3611449 A1 | 10/1987 |
| DE | 3611449 | 10/1987 |
| DE | 34 06 185 C2 | 10/1988 |
| DE | 3803894 | 8/1989 |
| DE | 3803894 A1 | 8/1989 |
| DE | 3803898 A1 | 8/1989 |
| DE | 3803898 | 8/1989 |
| DE | 39 12 504 A1 | 10/1990 |
| DE | 196 19 961 A1 | 11/1997 |
| EP | 0704240 | 4/1986 |
| EP | 0327815 | 8/1989 |
| EP | 0389041 | 9/1990 |
| EP | 0452619 B1 | 1/1991 |
| EP | 0452619 | 10/1991 |
| EP | 0 394 677 B1 | 2/1992 |
| EP | 0 327 721 B1 | 4/1992 |
| EP | 0 327 814 B1 | 4/1992 |
| EP | 327 723 B1 | 10/1992 |
| EP | 578 441 A2 | 1/1994 |
| EP | 0723 810 A1 | 3/1996 |
| EP | 0792859 | 9/1997 |
| EP | 0798040 | 10/1997 |

OTHER PUBLICATIONS

U. S. application No. 08/857,491, filed May 16, 1997.

* cited by examiner

*Primary Examiner*—Mark L. Bell
*Assistant Examiner*—Patricia L. Hailey
(74) *Attorney, Agent, or Firm*—Smith, Gambrell & Russell, LLP

(57) ABSTRACT

Moldings are disclosed for use as a catalyst or catalyst support for hydrating olefin, such as ethylene and propylene. The moldings are based on a pyrogenically produced mixed oxide having the following physicochemical parameters:

| | |
|---|---|
| External diameter | 0.8–25 mm |
| BET surface area | 5–400 m²/g |
| Pore volume | 0.2–1.8 ml/g |
| Fracture strength | 5 to 350 N |
| Composition | At least two materials selected from the group of $SiO_2$, $Al_2O_3$, $TiO_2$ and $ZrO_2$ in any desired combination, with the proviso that when the combination is a $SiO_2/Al_2O_3$ mixed oxide, at least 75 wt. % of $SiO_2$ is present based on the total weight of the mixed oxide. |
| Other constituents | <1 wt. % |
| Bulk density | 250–1500 g/l. |

The moldings are produced by homogenizing pyrogenically produced mixed oxide as desired with water and one or more compounds selected from the group of methylcellulose, methylhydroxyethylcellulose, wax, polyethylene glycol, magnesium stearate or aluminium stearate; drying the product at a temperature of 70–150° C.; optionally comminuting to yield a powder; optionally compression molding the powder to yield moldings; and performing heat treatment for a period of 0.5 to 10 hours at a temperature of 400 to 1200° C. Prior to drying, the mixture may also be subjected to kneading and/or shaping processes and extruded.

19 Claims, 4 Drawing Sheets

MOLDINGS INCLUDING PYROGENIC MIXED OXIDE AND THE USE THEREOF

INTRODUCTION AND BACKGROUND

This invention relates to moldings based on pyrogenically produced mixed oxide, to a process for the production thereof, and to the use thereof as a catalyst support or as a catalyst.

Pyrogenically produced oxides are distinguished by extreme fineness and a correspondingly elevated specific surface area, very high purity, spherical particle shape, and the absence of pores. Due to these properties, there is increasing interest in pyrogenically produced oxides as supports for catalysts (see, for example, D. Koth, H. Ferch, Chem. Ing. Techn. 52, 628 (1980)). In some cases, pyrogenic oxides are also used as catalysts.

Because pyrogenically produced oxides are particularly finely divided, shaping them into catalyst supports or catalysts occasions some difficulties.

DE-A 31 32 674 discloses a process for the production of compression moldings from pyrogenically produced oxides in which silica sol is used as the binder. This document is incorporated by reference herein in its entirety.

DE-A 34 06 185 discloses a process for the production of compression moldings in which glaze frit powders are used as a binder and glycerol as a lubricant. This document is incorporated by reference herein in its entirety.

DE-A 39 12 504 discloses a process for the production of compression moldings in which aluminum stearate, magnesium stearate and/or graphite are used as lubricants, and urea together with methylcellulose are used as pore formers. This document is incorporated by reference herein in its entirety. These compression moldings are offered for sale as Aerosil® tablets no. 350, available from Degussa. They contain approx. 0.4 wt. % Mg.

Moldings based on pyrogenic oxides are known. EP-B 0 393 356 describes high purity moldings based on pyrogenically produced silicon dioxide. (This document is incorporated by reference herein in its entirety.) These moldings comprise >99 wt. % of pyrogenically produced $SiO_2$ and have a low binder material content. The Examples in this patent document describe the use of Mg and Al stearates.

DE-A 196 19 961 describes moldings based on pyrogenically produced silicon dioxide. The purity of these moldings has been increased to >99.8 wt. % of $SiO_2$. This document is incorporated by reference herein in its entirety.

Documents EP-B 0 452 619, EP-B 0 394 677 and EP-B 0 327 723 describe moldings based on pyrogenically produced titanium dioxide. (These documents are incorporated by reference herein in their entirety.) These moldings are differentiated inter alia by their content of anatase and rutile, by purity, by dimensions, etc. Titanium dioxide contents are stated as >99 wt. %, >99.5 wt. % and >94 wt. %. In the latter case, the content of anatase is at least 50 wt. %, with the remaining 0–6 wt. % comprising non-pyrogenically produced $SiO_2$ and/or non-pyrogenically produced $Al_2O_3$.

EP-B 0 327 721 describes moldings based on pyrogenically produced $Al_2O_3$. This is document is incorporated by reference herein in its entirety. Purity is stated as a content of 94–99 wt. % $Al_2O_3$. The remaining 1–6 wt. % are $SiO_2$. The $SiO_2$ fraction originates from kaolin, which is used during shaping of the aluminum oxide powder.

Moldings based on pyrogenically produced $ZrO_2$ also are known. Such materials are described in the document EP-B 0 327 814, which is incorporated by reference herein in its entirety. The purity of these materials is stated as >92 wt. % of zirconium dioxide. In this case too, the remainder contains fractions of non pyrogenically produced $SiO_2$ and $Al_2O_3$. Small fractions of $HfO_2$, which is a natural impurity in $ZrO_2$, are also present.

Known moldings based on pyrogenically produced oxides may be used as catalysts or catalyst supports. The elevated purity and good mechanical and chemical properties play an important part in many applications.

It is furthermore known to modify the composition of the moldings for particular applications by purposefully adding certain foreign elements. Examples of this are described in the document EP-A 0 723 810, which is incorporated by reference herein in its entirety. Supports are mentioned which include $SiO_2$, the composition of which has been modified by impregnation with Al, Zr and/or Ti. Once the molding had been impregnated, it was dried and calcined. This known production method is highly elaborate, as modifying the base material by impregnation, drying and calcination makes substantial demands with regard to equipment and energy. Moreover, production times for modified moldings are distinctly longer.

It is known to produce pyrogenic mixed oxides by simultaneously reacting at least two different metals in the form of volatile metal compounds, for example chlorides, in a $H_2/O_2$ flame. One example of such an oxide is the $SiO_2/Al_2O_3$ mixed oxide, which is produced by Degussa and sold under the name Aerosil® MOX 170. When producing Aerosil® MOX 170, a mixture of $SiCl_4$ and $AlCl_3$ is directly hydrolyzed in a flame. Corresponding silanes, such as, for example, methyltrichlorosilane, trichlorosilanes, etc., may also be used as a raw material instead of or in addition to the chlorides. (Degussa Technical Bulletin Pigments, No. 11: Basic Characteristics of Aerosil®, pages 37 and 11–12; AT-A 195 893; DE-A 952 891; DE-A 25 33 925; DE-A 27 02 896. These documents each are entirely incorporated herein by reference.)

It is furthermore known to produce moldings based on pyrogenically produced silicon dioxide/aluminum oxide mixed oxide (EP-B 0 327 815). This document is incorporated by reference herein in its entirety. These mixed oxides contain at least 75 wt. % silicon dioxide and at most 25 wt. % aluminum oxide.

SUMMARY OF THE INVENTION

The present invention provides moldings based on pyrogenically produced mixed oxide, having the following physicochemical parameters:

| | |
|---|---|
| External diameter | 0.8–25 mm |
| BET surface area | 5–400 $m^2/g$ |
| Pore volume | 0.2–1.8 ml/g |
| Fracture strength | 5 to 350 N |
| Composition | At least two materials selected from the group of $SiO_2$, $Al_2O_3$, $TiO_2$ and $ZrO_2$ in any desired combination, with the proviso that when the composition includes $SiO_2/Al_2O_3$ mixed oxides, at least 75 wt. % of the mixed oxides is $SiO_2$, based on the total weight of the mixed oxides |
| Other constituents | <1 wt. % |
| Bulk density | 250–1500 g/l |

The moldings according to the invention may be present as extruded moldings, extrudates or tablets. They may assume the form of cylinders, cylinders having rounded end faces, spheres, rings, wagon wheels, miniliths or other shapes conventional for fixed bed catalysts.

The present invention also provides a process for the production of moldings according to the invention based on pyrogenically produced mixed oxide having the following physicochemical parameters:

| | |
|---|---|
| External diameter | 0.8–25 mm |
| BET surface area | 5–400 m$^2$/g |
| Pore volume | 0.2–1.8 ml/g |
| Fracture strength | 5–350 N |
| Composition | At least two materials selected from the group of SiO$_2$, Al$_2$O$_3$, TiO$_2$ and ZrO$_2$ in any desired combination, with the proviso that when the composition includes SiO$_2$/Al$_2$O$_3$ mixed oxides, at least 75 wt. % of the mixed oxides is SiO$_2$, based on the total weight of the mixed oxides |
| Other constituents | <1 wt. % |
| Bulk density | 250–1500 g/l | which process is characterized in that a pyrogenically produced mixed oxide is homogenized as desired with one or more compounds selected from the group of methylcellulose, methylhydroxyethylcellulose, wax, magnesium stearate, aluminum stearate or polyethylene glycol, with the addition of water; dried at a temperature of 70–150° C.; optionally comminuted to yield a powder; the powder is compression molded to yield moldings; and then heat treated for a period of 0.5 to 10 hours at a temperature of 400 to 1200° C.

The moldings according to the invention may be produced in stamping presses, eccentric presses, isostatic presses, extrusion presses, rotary presses or compactors.

Before pressing, in one particular embodiment of the invention, the mixture may exhibit the following composition:

| | |
|---|---|
| 50–90 wt. % | mixed oxide |
| 0.1–20 wt. % | methylhydroxyethylcellulose, preferably 5–15 wt. % |
| 0.1–15% | wax, preferably 5–12 wt. % |
| 0.1–15% | polyethylene glycol, preferably 5–10 wt. %. |

Fracture strength, specific total surface area and pore volume may be adjusted to a certain extent by varying the quantities of starting materials and the compression pressure.

The present invention also provides a process for the production of moldings according to the invention based on pyrogenically produced mixed oxide having the following physicochemical parameters:

| | |
|---|---|
| External diameter | 0.8–25 mm |
| BET surface area | 5–400 m$^2$/g |
| Pore volume | 0.2–1.8 ml/g |
| Fracture strength | 5–350 N |
| Composition | At least two materials selected from the group of SiO$_2$, Al$_2$O$_3$, TiO$_2$ and ZrO$_2$, in any desired combination, with the proviso that when the composition includes SiO$_2$/Al$_2$O$_3$ mixed oxides, at least 75 wt. % of the mixed oxides is SiO$_2$, based on the total weight of the mixed oxides |
| Other constituents | <1 wt. % |
| Bulk density | 250–1500 g/l | which process is characterized in that a pyrogenically produced mixed oxide is homogenized as desired with one or more compounds selected from the group of methylcellulose, methylhydroxyethylcellulose, wax, magnesium stearate, aluminum stearate or polyethylene glycol, with the addition of water; subjected to a kneading and shaping process; extruded; the extrudates are optionally chopped to the desired length by means of a chopping device; dried at a temperature of 70–150° C.; and then heat treated for a period of 0.5 to 10 hours at a temperature of 400 to 1200° C.

Any mixers or mills that permit good homogenization, such as, for example, blade mixers, fluidized bed mixers, centrifugal mixers or air-swept mixers, are suitable for performing the process according to the invention. Particularly suitable mixers are those with which the material being mixed may additionally be compacted, such as, for example plough bar mixers, pan mills or ball mills. Mixing and kneading, however, may also proceed directly in an extruder. The extrudates may also be produced in single or twin-screw extruders, extrusion presses, as well as in compactors. After homogenization, the product may be largely dried at 70–150° C., such that, after an optional comminution operation, a pourable powder is obtained.

BRIEF DESCRIPTION OF THE DRAWINGS

The present invention will be further understood with reference to the accompanying drawings, wherein.

DETAILED DESCRIPTION OF THE INVENTION

Figure 1:
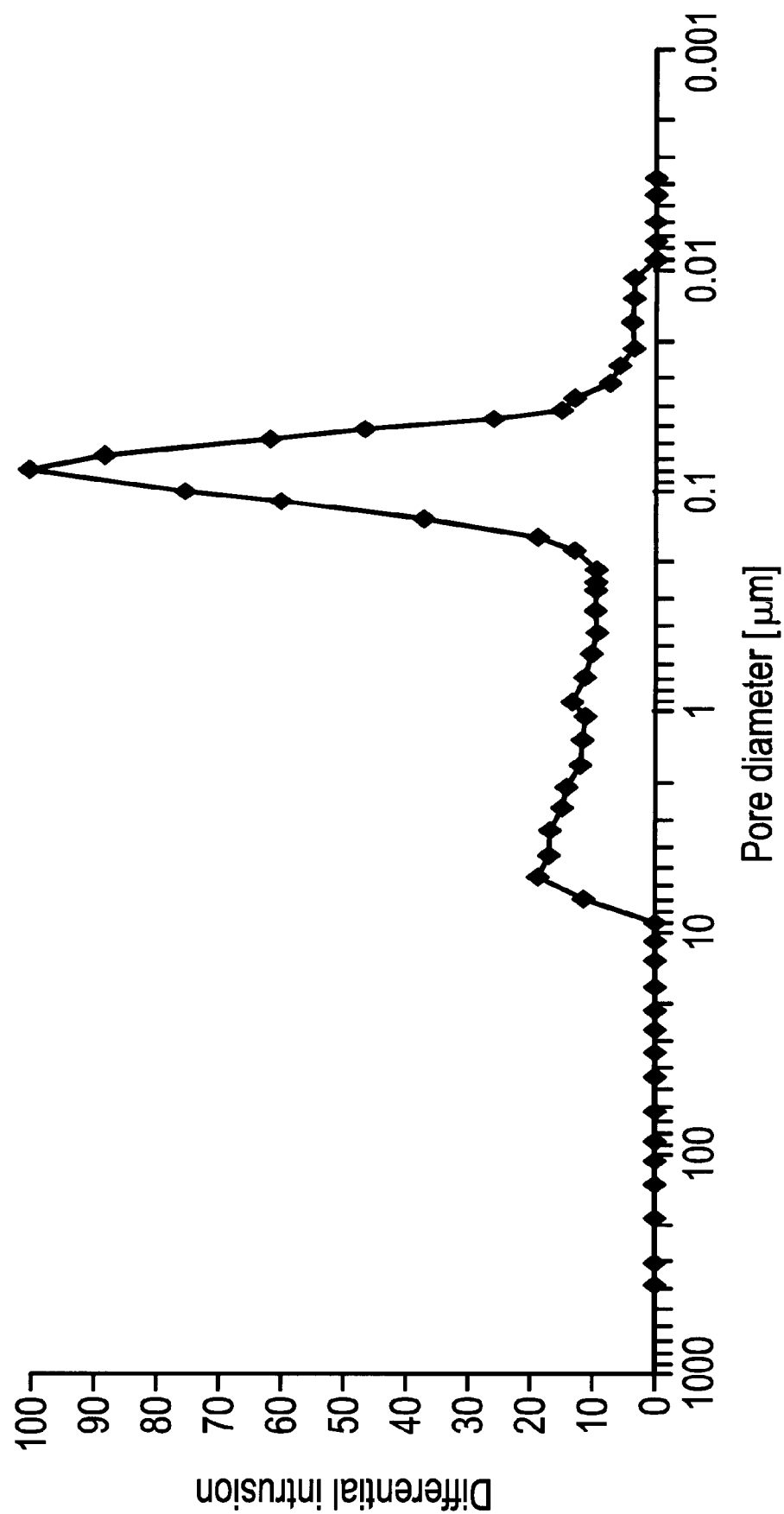
FIG. 1 is a graph illustrating pore size distribution of an aged catalyst on the molding according to Example 1.

While the above Summary generally describes this invention, the invention and specific embodiments according to the invention will now be explained in more detail.

The moldings according to the invention may be used either directly as a catalyst or as a catalyst support. In the latter case, once produced, the moldings may be brought into contact with a catalytically active substance and optionally be activated by a suitable post-treatment process. Such contacting and activating processes are conventional and well known to those skilled in the art.

The moldings made from the pyrogenically produced mixed oxide produced according to the invention may in particular be used in olefin hydration processes.

The moldings according to the invention exhibit the following advantages:

In comparison with the moldings produced according to documents EP 0 723 810 A1 and EP 0 792 859 A2 (EP 0 792 859 A2 is entirely incorporated by reference herein), production of the moldings according to the invention is substantially simpler and makes reduced demands with regard to energy, time and equipment.

The mouldings according to the invention exhibit improved hydrothermal stability in hydration processes.

Catalysts are subject to aging during service, which results in a reduction in activity and/or selectivity. Deactivation is frequently due to a reduction in the specific surface area of the support caused by elevated temperatures. The specific surface area of the support is closely associated with the pore structure thereof. Moreover, solids having an elevated surface area generally have a completely amorphous or predominantly amorphous structure, which has the tendency to transform into a thermodynamically stable state with crystallite growth and reduction in specific surface area.

It has been found that known catalyst supports containing silicon dioxide also undergo such aging. Hydration conditions accelerate aging. It is furthermore known that impurities, in particular alkali metals, promote the aging of supports containing silicon dioxide under hydrothermal conditions (see, for example, R. K. Iler in "The Chemistry of Silica", page 544, John Wiley & Sons (1979), the disclosure of which is incorporated by reference herein in its entirety).

The catalyst supports based on pyrogenically produced silicon dioxide described in EP 0 393 356 are also subject to aging under hydrothermal conditions, wherein small pores combine to form larger pores with the loss of specific surface area. Initially, pore volume scarcely changes.

As described in EP 0 792 859 A2, aging stability may be increased by adding Ti and/or Zr. In the process described in this patent document, these elements are applied onto an $SiO_2$ molding by impregnation, followed by drying and calcination. As already explained above, these additional stages demand time, energy and equipment.

One object of the present invention, therefore, is to provide catalyst supports that exhibit improved aging stability when used under hydrothermal conditions. This object of stabilization is better achieved by using catalysts which have an active component on a molding according to the invention based on a pyrogenic mixed oxide.

The present invention furthermore provides a process for hydrating olefins to yield the corresponding alcohols in the presence of phosphoric acid or another active component, for example a heteropolyacid, as the catalyst on a molding according to the invention based on pyrogenically produced mixed oxide.

A process in which the moldings according to the invention based on pyrogenically produced mixed oxide may be used is described, for example, in document EP-A 0 578 441 (the disclosure of which is incorporated by reference herein in its entirety). In this process, water and ethylene are reacted at temperatures of between 225 and 280° C. and pressures of between 20 and 240 bar to yield ethanol. A molar ratio of water:ethylene in the range from 0. 15 to 0.5 is used in this process. Catalyst loading, measured in grams of water/ethylene mixture per minute and milliliter of catalyst, may be selected within the range from 0.01 to 0.1 g/(min×ml). Diethyl ether is formed as a secondary product in this reaction.

Isopropanol is produced by hydrating propylene under similar conditions, but at a somewhat reduced temperature in the range between 180 and 225° C. n-Propanol is obtained as a secondary product in this reaction.

According to EP 0 578 441 A2, pellets of synthetic silicon dioxide having elevated fracture strength, elevated porosity and a low metallic impurity content are used as a known catalyst support for the phosphoric acid active component.

The use of the moldings according to the invention for hydrating olefin is particularly advantageous. The stabilization of the support is also favorable for other catalytic reactions performed under hydrothermal conditions.

In the case of olefin hydration, phosphoric acid is applied as the active component onto the catalyst support. To this end, the support is immersed in an aqueous solution of phosphoric acid and impregnated therewith. Phosphoric acid solutions containing 15 to 85 wt. % of phosphoric acid, relative to the total weight of the solution, are used for this purpose. One main application for the hydration of olefins is the hydration of ethylene to produce ethanol and diethyl ether and the hydration of propylene to produce isopropanol. Reaction conditions known from the prior art are used in these cases.

A further object of the present invention is to provide a catalyst that exhibits improved aging stability when used under hydrothermal conditions. This object is achieved by a phosphoric acid catalyst which contains 1 to 50 wt. % of $H_3PO_4$, relative to the total weight of the catalyst, on a molding according to the invention. This catalyst is characterized in that the molding based on pyrogenically produced mixed oxide has the following physicochemical parameters:

| | |
|---|---|
| External diameter | 0.8–25 mm |
| BET surface area | 5–400 m²/g |
| Pore volume | 0.2–1.8 ml/g |
| Fracture strength | 5 to 350 N |
| Composition | At least two materials selected from the group of $SiO_2$, $Al_2O_2$, $TiO_2$ and $ZrO_2$ in any desired combination, with the proviso that when the composition is $SiO_2/Al_2O_3$ mixed oxide, at least 75 wt. % of $SiO_2$ is present, based on a total amount of the mixed oxide. |
| Other constituents | <1 wt. % |
| Bulk density | 250–1500 g/l. |

The catalysts according to the invention are produced by surface-modifying the moldings with phosphoric acid as the active component. To this end, the support particles or moldings are immersed in an aqueous solution of phosphoric acid and impregnated therewith, so filling the pore volume of the support particles with the phosphoric acid solution. Phosphoric acid solutions containing 15 to 85 wt. % of phosphoric acid, relative to the total weight of the solution, are used for this purpose. Depending upon the particular pore volume of the support particles, the particles may be surface modified in this manner with 1 to 50 wt. % of $H_3PO_4$, relative to the total weight of the finished catalyst.

Mixed oxides are produced by injecting volatile metal compounds into a detonating gas flame of hydrogen and air. These metal compounds hydrolyze under the action of the water generated in the detonating gas reaction to yield metal oxides and hydrochloric acid. After leaving the flame, the metal oxide enters a so-called coagulation zone, in which the mixed oxide primary particles and primary aggregates agglomerate. The product, which at this stage is in the form of a kind of aerosol, is separated from the gaseous accompanying substances in cyclones and is then post-treated with moist hot air. The residual hydrochloric acid content may be reduced to below 0.025% by this process. Because, at the end of this process, a mixed oxide is obtained with a bulk density of only approximately 15 g/l, vacuum compaction may subsequently be performed, by means of which tamped densities of approximately 50 g/l and above may be established.

The particle sizes of the products obtained in this manner may be varied by means of the reaction conditions, such as, for example, flame temperature, hydrogen or oxygen content, the nature and quantity of the metal chloride substances, the residence time in the flame or the length of the coagulation section.

EXAMPLES

The examples that follow illustrate production of materials according to the invention and their use. These examples should be construed as illustrating the invention and not as limiting it. In these examples, BET surface area is determined with nitrogen according to the procedure described in DIN 66 131. The pore volume is calculated from the sum of the micro-, meso- and macropore volumes. Fracture strength is determined using a model TBH 28 Erweka fracture strength tester. Micro- and mesopores are determined by recording an $N_2$ isotherm and evaluating it in accordance with BET, de Boer and Barret, Joyner, Halenda. Bulk density is determined in the conventional manner known to those skilled in the art. Macropores are determined using the Hg infiltration method.

Example 1

| | |
|---|---|
| 71.4 wt. % | of pyrogenic $SiO_2/TiO_2$ mixed oxide (70 wt. % $SiO_2$, 30 wt. % $TiO_2$) |
| 12.9 wt. % | of methylhydroxyethylcellulose |
| 7.1 wt. % | of wax |
| 8.6 wt. % | of polyethylene glycol | are compacted with the addition of water, dried at 90° C., comminuted to yield a pourable powder, and shaped into moldings using an eccentric press. The green tablets are calcined for 6 hours at 750° C.

Example 2

| | |
|---|---|
| 71.4 wt. % | of pyrogenic $SiO_2/TiO_2$ mixed oxide (82 wt. % $SiO_2$, 18 wt. % $TiO_2$) |
| 12.9 wt. % | of methylhydroxyethylcellulose |
| 7.1 wt. % | of wax |
| 8.6 wt. % | of polyethylene glycol | are compacted with the addition of water, dried at 100° C., comminuted to yield a pourable powder and shaped into moldings using an eccentric press. The green tablets are calcined for 6 hours at 700° C.

Example 3

| | |
|---|---|
| 71.4 wt. % | of pyrogenic $SiO_2/TiO_2$ mixed oxide (91 wt. % $SiO_2$, 9 wt. % $TiO_2$) |
| 12.9 wt % | of methylhydroxyethylcellulose |
| 7.1 wt. % | of wax |
| 8.6 wt. % | of polyethylene glycol | are compacted with the addition of water, dried at 100° C., comminuted to yield a pourable powder and shaped into moldings using an eccentric press. The green tablets are calcined for 10 hours at 600° C.

Example 4

| | |
|---|---|
| 71.4 wt. % | of pyrogenic $SiO_2/TiO_2$ mixed oxide (91 wt. % $SiO_2$, 9 wt. % $TiO_2$) |
| 12.9 wt. % | of methylhydroxyethylcellulose |
| 7.1 wt. % | of wax |
| 8.6 wt. % | of polyethylene glycol | are compacted with the addition of water, dried at 100° C., comminuted to yield a pourable powder and shaped into moldings using an eccentric press. The green tablets are calcined for 6 hours at 750° C.

Example 5

| | |
|---|---|
| 90.0 wt. % | of pyrogenic $TiO_2/ZrO_2$ mixed oxide (94 wt. % $TiO_2$, 6 wt. % $ZrO_2$) |
| 5.0 wt. % | of methylhydroxyethylcellulose |
| 2.0 wt. % | of wax |
| 3.0 wt. % | of polyethylene glycol | are compacted with the addition of water, dried at 100° C., comminuted to yield a pourable powder and shaped into moldings using an eccentric press. The green tablets are calcined for 10 hours at 400° C.

Example 6

| | |
|---|---|
| 92.6 wt. % | of pyrogenic $TiO_2/ZrO_2$ mixed oxide (94 wt. % $TiO_2$, 6 wt. % $ZrO_2$) |
| 0.9 wt. % | of methylhydroxyethylcellulose |
| 6.5 wt. % | of wax | are compacted with the addition of water, dried at 100° C., comminuted to yield a pourable powder and shaped into moldings using an eccentric press. The green tablets are calcined for 10 hours at 400° C.

The moldings obtained according to Examples 1–6 exhibit the following physicochemical parameters:

| Example Tablet shape | 1 Cyl- inders | 2 Cyl- inders | 3 Cyl- inders | 4 Cyl- inders | 5 Rings | 6 Rings |
|---|---|---|---|---|---|---|
| External diameter × height × internal diameter | 5 × 5 | 6 × 5.5 | 6 × 5.5 | 5 × 5 | 8 × 5 × 3 | 8 × 5 × 3 |
| BET surface area ($m^2/g$) | 86 | 101 | 209 | 191 | 44 | 46 |
| Pore volume (ml/g) | 0.69 | 0.59 | 0.83 | 0.72 | 0.34 | 0.42 |
| Fracture strength (N) | 21 | 34 | 37 | 66 | 15 | 12 |
| Bulk density (g/l) | not deter- mined | 610 | 505 | not deter- mined | 860 | 800 |

Investigation of Aging Stability of Catalysts According to the Invention

The aging stability of the catalysts according to the invention and of a comparison catalyst according to the prior art under hydrothermal conditions is investigated by determining the pore structure of the aged catalysts, i.e., after impregnating the supports with phosphoric acid and hydrothermal aging. Pore structure is determined by means of mercury porosimetry. The unaged catalysts (according to the invention and comparison catalysts) have pores of between 0.01 and 0.05 $\mu$m.

The pore size distribution curves shown in FIGS. 1 to 4 reveal the differential penetration (intrusion) of the mercury as a function of pore diameter. Differential intrusion is stated in arbitrary units, and the curves are in each case extended over the available area of the diagram.

Example 7

Figure 2:
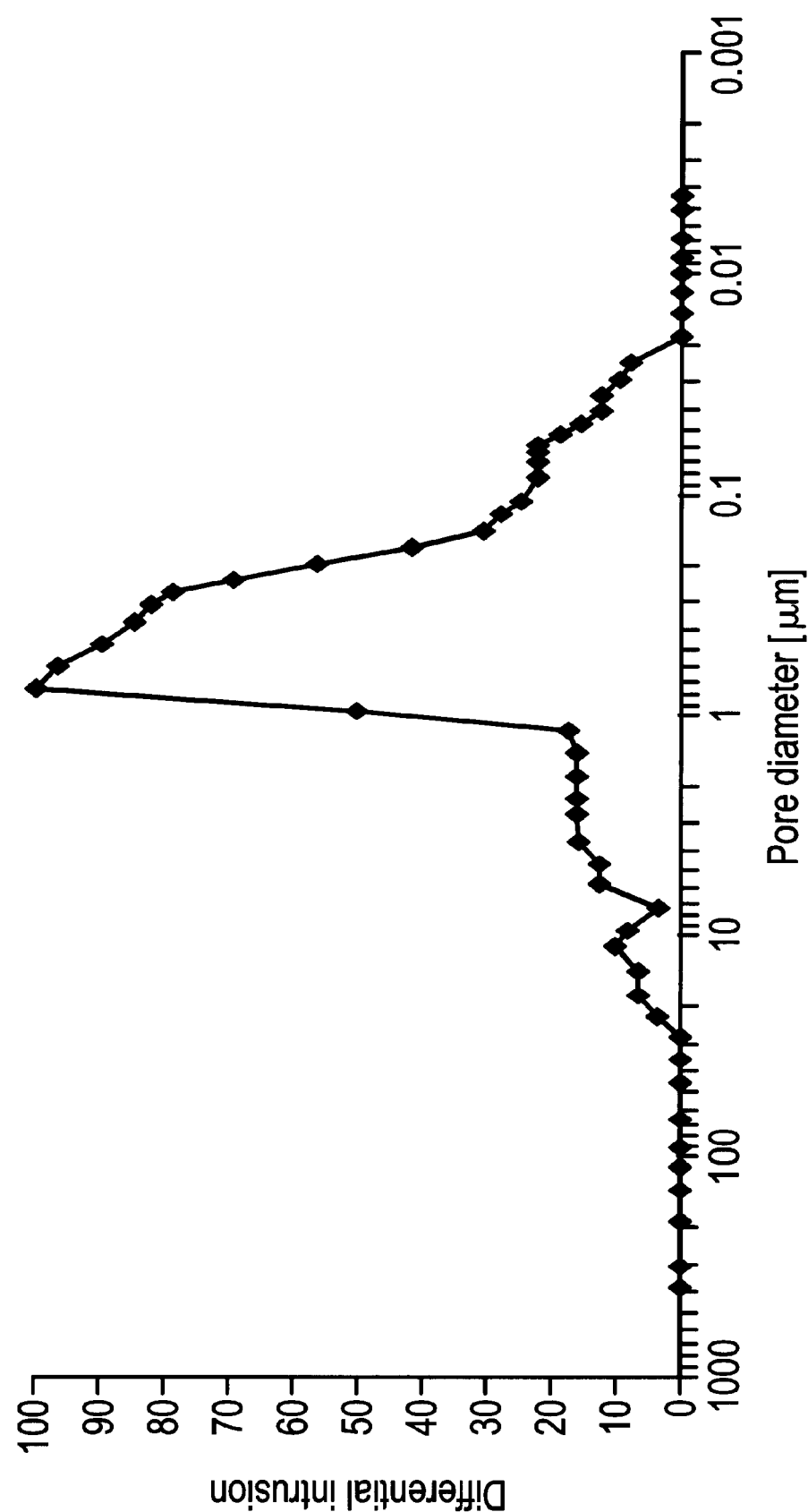
FIG. 2 is a graph illustrating pore size distribution of an aged catalyst on the molding according to Example 2.
Figure 3:
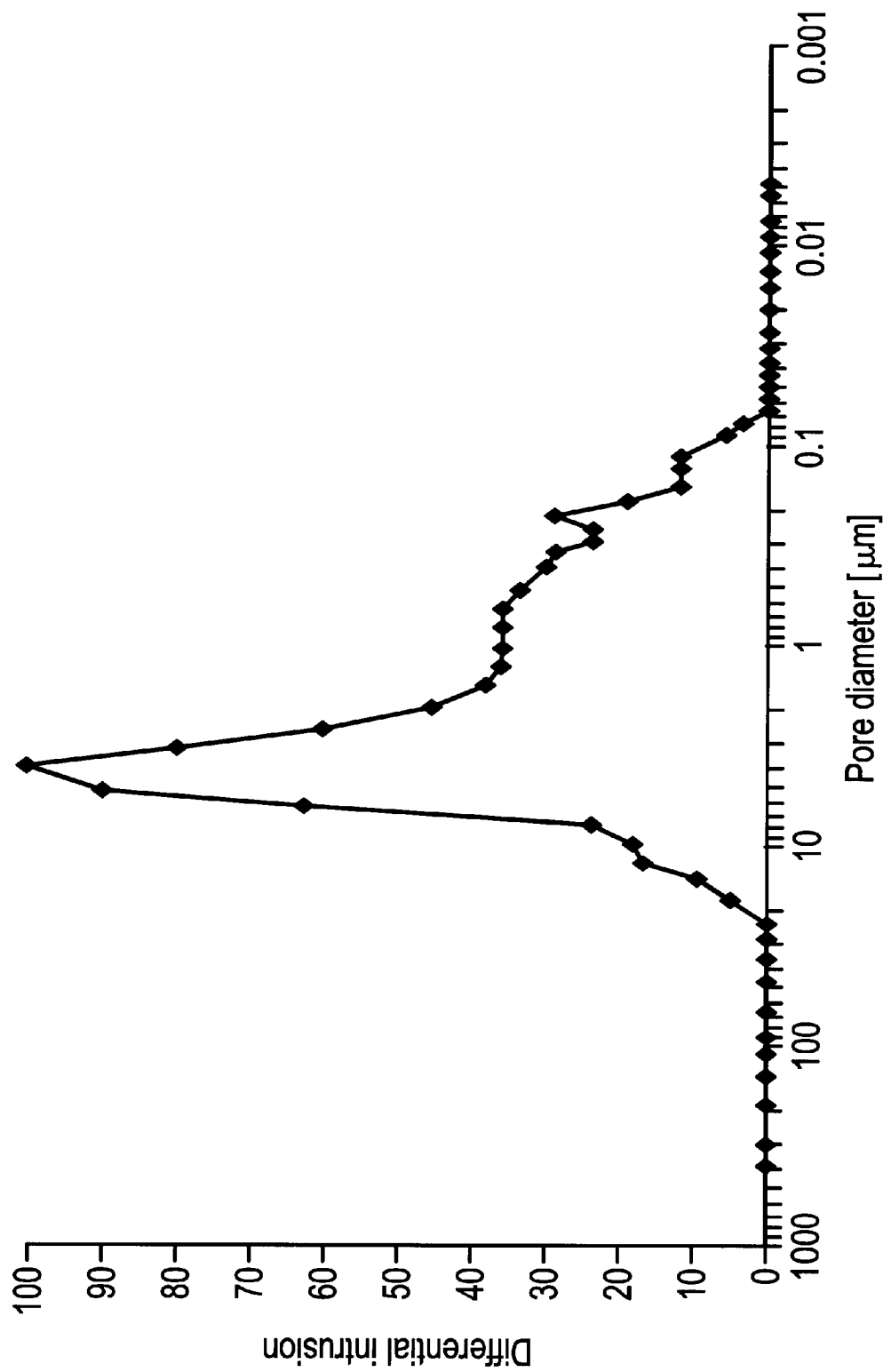
FIG. 3 is a graph illustrating pore size distribution of an aged catalyst on the molding according to Example 3.

The catalyst supports from Examples 1, 2 and 3 are each immersed in a 60 wt. % $H_3PO_4$ solution and then exposed to a water vapor pressure of 15 bar and 350° C. in a high pressure apparatus for 40 hours. The pore size distribution of the aged catalysts is determined using Hg porosimetry. FIGS. 1 to 3 are a graphical representation of the results. As may be seen from these Figures, pore enlargement has occurred since, as explained above, the unaged materials have pores in the range from 0.01 to 0.05 μm.

Example 8

Comparative Example

Figure 4:
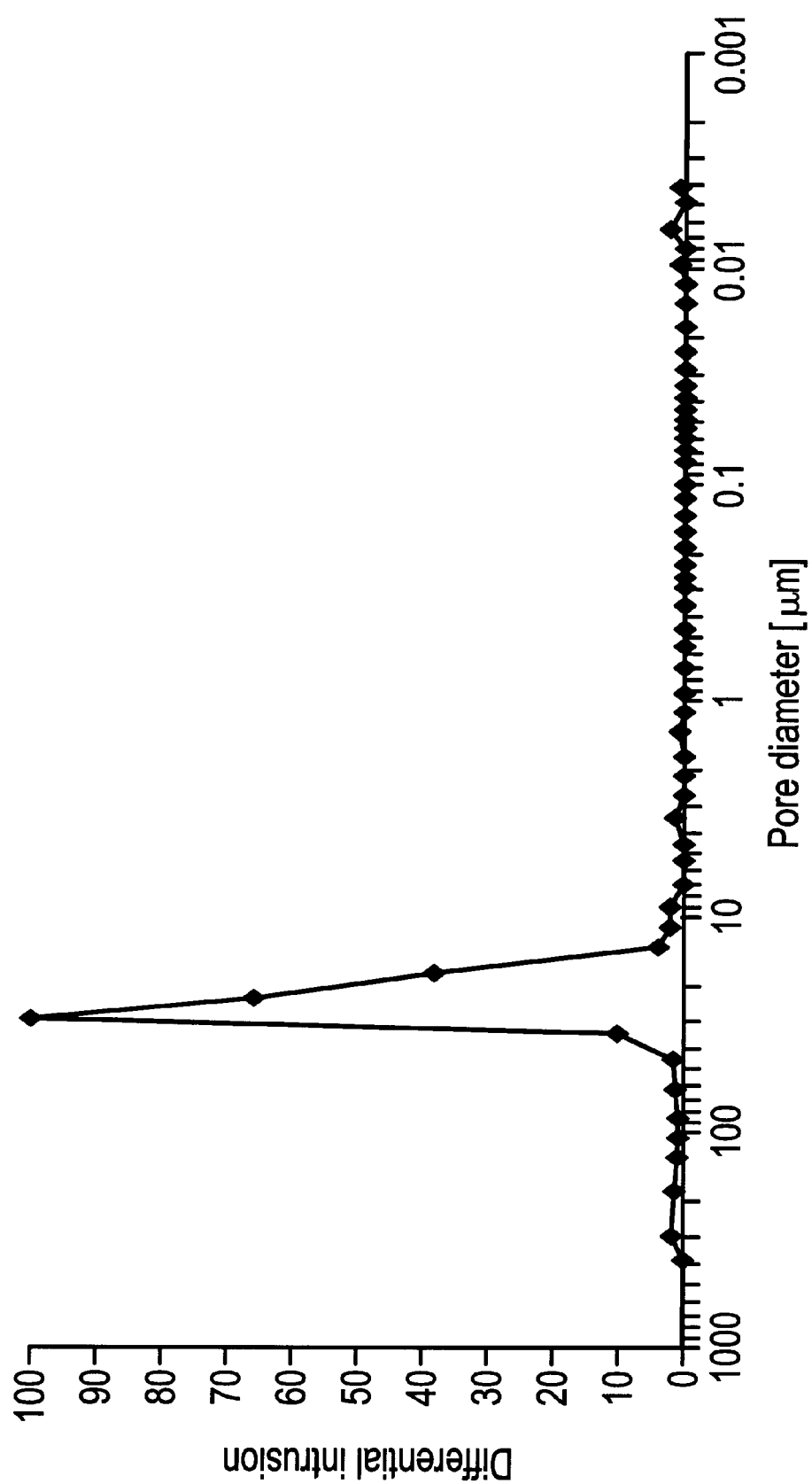
FIG. 4 is a graph illustrating pore size distribution of an aged catalyst on the molding, not according to the invention, but according to Example 8 (a Comparative Example).

A known compression molding (catalyst support 350, available from Degussa, containing 0.4 wt. % Mg (elemental), BET surface area 180 m²/g, bulk density 490 g/l, total pore volume 0.8 cm³/g, tablets of diameter 6 mm and height 5.5 mm) is loaded with phosphoric acid (60 wt. %) and then exposed to a water vapor pressure of 15 bar and 350° C. in a high pressure apparatus for 41 hours. The pore size distribution of the aged catalyst is determined using Hg porosimetry. FIG. 4 is a graphical representation of the results.

The hydrothermally aged supports exhibit a maximum of the pore size distribution at pore diameters of between 20 and 30 μm. The proportion of pores having a diameter of less than 10 μm is much lower than in the materials according to the invention in FIGS. 1 to 3. The materials according to the invention are thus distinctly more stable toward hydrothermal aging.

Further variations and modifications of the foregoing will be apparent to those skilled in the art, and are intended to be encompassed by the claims which follow.

German priority document 198 43 845.1 is relied upon, and incorporated herein by reference in its entirety.

We claim:

1. A molding for use as a catalyst support or as a catalyst, comprised of a pyrogenically produced mixed oxide, having the following physicochemical parameters:

| | |
|---|---|
| External diameter | 0.8–25 mm |
| BET surface area | 5–400 m²/g |
| Pore volume | 0.2–1.8 ml/g |
| Fracture strength | 5 to 350 N |
| Composition | at least two oxides selected from the group of $SiO_2$, $Al_2O_3$, $TiO_2$ and $ZrO_2$, wherein $SiO_2$ is present in an amount of from 70 to 91 wt. %, and $TiO_2$ is present in an amount of from 9 to 30 wt. %, with respect to a total weight of the at least two oxides |
| Other constituents | <1 wt. % |
| Bulk density | 250–1500 g/l. |

2. A process for producing a molding according to claim 1, the process comprising:
mixing the pyrogenically produced mixed oxide with water and at least one member selected from the group consisting of methylcellulose, methylhydroxyethylcellulose, wax, polyethylene glycol, magnesium stearate and aluminium stearate, to yield a mixture;
drying the mixture at a temperature of from 70–150° C.;
compression molding the mixture to yield moldings; and
heat treating the moldings for a period of from 0.5 to 10 hours, at a temperature of 400 to 1200° C.

3. The process according to claim 2, wherein said mixture, after drying, is comminuted to yield a powder.

4. A phosphoric acid catalyst, comprising:
a shaped support comprised of the molding according to claim 1; and
from 1 to 50 wt. % of $H_3PO_4$, relative to a total weight of the catalyst.

5. A process for producing a molding according to claim 1, the process comprising:
mixing the pyrogenically produced mixed oxide with water and at least one member selected from the group consisting of methylcellulose, methylhydroxyethylcellulose, wax, polyethylene glycol, magnesium stearate and aluminum stearate, to yield a mixture;
subjecting the mixture to a kneading or shaping process;
extruding the mixture to yield extrudates;
drying the extrudates at a temperature of from 70–150° C.; and
heat treating the extrudates for a period of from 0.5 to 10 hours at a temperature of 400 to 1200° C.

6. The process according to claim 5, wherein the extrudates, after being formed, are either chopped or crushed to a desired length.

7. A phosphoric acid catalyst, comprising:
a shaped support comprised of the molding according to claim 1; and
from 1 to 50 wt. % of $H_3PO_4$, relative to a total weight of the catalyst.

8. A method for hydrating an olefin, comprising contacting the olefin with a phosphoric acid catalyst which comprises:
a shaped support comprised of the molding according to claim 1; and
from 1 to 50 wt. % of $H_3PO_4$, relative to a total weight of the catalyst, under sufficient conditions to thereby produce a hydrated olefin.

9. A method for hydrating propylene to produce isopropanol, comprising contacting the propylene with a phosphoric acid catalyst which comprises:
a shaped support comprised of the molding according to claim 1; and
from 1 to 50 wt. % of $H_3PO_4$, relative to a total weight of the catalyst, under sufficient conditions to thereby produce isopropanol.

10. A method for hydrating ethylene to produce ethanol, comprising contacting the ethylene with a phosphoric acid catalyst which comprises:
a shaped support comprised of the molding according to claim 1; and
from 1 to 50 wt. % of $H_3PO_4$, relative to a total weight of the catalyst, under sufficient conditions to thereby produce ethanol.

11. A molding for use as a catalyst support or as a catalyst, comprised of a pyrogenically produced mixed oxide, having the following physicochemical parameters:

| | |
|---|---|
| External diameter | 0.8–25 mm |
| BET surface area | 5–400 m²/g |
| Pore volume | 0.2–1.8 ml/g |
| Fracture strength | 5 to 350 N |
| Composition | $TiO_2$ and $ZrO_2$, and optionally at least one member selected from $SiO_2$, and $Al_2O_3$ |
| Other constituents | <1 wt. % |
| Bulk density | 250–1500 g/l. |

12. The molding according to claim 11, wherein the $TiO_2$ is present in an amount of 94 wt. %, and the $ZrO_2$ is present in an amount of 6 wt. %, with respect to a total weight of the at least two oxide materials.

13. A process for producing a molding according to claim 11, the process comprising:

mixing the pyrogenically produced mixed oxide with water and at least one member selected from the group consisting of methylcellulose, methylhydroxyethylcellulose, wax, polyethylene glycol, magnesium stearate and aluminium stearate, to yield a mixture;

drying the mixture at a temperature of from 70–150° C.;

compression molding the mixture to yield moldings; and heat treating the moldings for a period of from 0.5 to 10 hours, at a temperature of 400 to 1200° C.

14. The process according to claim 13, wherein said mixture, after drying, is comminuted to yield a powder.

15. A process for producing a molding according to claim 11, the process comprising:

mixing the pyrogenically produced mixed oxide with water and at least one member selected from the group consisting of methylcellulose, methylhydroxyethylcellulose, wax, polyethylene glycol, magnesium stearate and aluminum stearate, to yield a mixture;

subjecting the mixture to a kneading or shaping process;

extruding the mixture to yield extrudates;

drying the extrudates at a temperature of from 70–150° C.; and heat treating the extrudates for a period of from 0.5 to 10 hours at a temperature of 400 to 1200° C.

16. The process according to claim 2, wherein the extrudates, after being formed, are either chopped or crushed to a desired length.

17. A method for hydrating an olefin, comprising contacting the olefin with a phosphoric acid catalyst which comprises:

a shaped support comprised of the molding according to claim 11; and from 1 to 50 wt. % of $H_3PO_4$, relative to a total weight of the catalyst, under sufficient conditions to thereby produce a hydrated olefin.

18. A method for hydrating propylene to produce isopropanol, comprising contacting the propylene with a phosphoric acid catalyst which comprises:

a shaped support comprised of the molding according to claim 11; and from 1 to 50 wt. % of $H_3PO_4$, relative to a total weight of the catalyst, under sufficient conditions to thereby produce isopropanol.

19. A method for hydrating ethylene to produce ethanol, comprising contacting the ethylene with a phosphoric acid catalyst which comprises:

a shaped support comprised of the molding according to claim 11; and from 1 to 50 wt. % of $H_3PO_4$, relative to a total weight of the catalyst, under sufficient conditions to thereby produce ethanol.

* * * * *